US011025886B2

(12) United States Patent
Lo

(10) Patent No.: US 11,025,886 B2
(45) Date of Patent: *Jun. 1, 2021

(54) MULTI-LENS CAMERA WITH A SINGLE IMAGE SENSOR

(71) Applicant: 3D Media Ltd., Chai Wan (HK)

(72) Inventor: Kwok Wah Allen Lo, Causeway Bay (HK)

(73) Assignee: 3D MEDIA LTD., Chai Wan (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,073

(22) Filed: Jul. 23, 2019

(65) Prior Publication Data

US 2019/0373246 A1 Dec. 5, 2019

Related U.S. Application Data

(63) Continuation of application No. 13/566,292, filed on Aug. 3, 2012, now Pat. No. 10,412,367.

(60) Provisional application No. 61/574,604, filed on Aug. 5, 2011.

(51) Int. Cl.
*H04N 5/232* (2006.01)
*H04N 13/218* (2018.01)

(52) U.S. Cl.
CPC ........... *H04N 13/218* (2018.05); *H04N 5/232* (2013.01)

(58) Field of Classification Search
CPC .. H04N 13/0217; H04N 5/232; H04N 13/218; G03B 13/00
USPC ............................... 348/46, 36, 39, 348, 345
See application file for complete search history.

(56) References Cited

U.S. PATENT DOCUMENTS

| 7,683,962 | B2 | 3/2010 | Border et al. |
| 8,355,042 | B2 | 1/2013 | Lablans |
| 8,400,555 | B1 | 3/2013 | Georgiev et al. |
| 8,885,059 | B1 | 11/2014 | Venkataraman et al. |
| 2008/0165270 | A1* | 7/2008 | Watanabe .......... H04N 5/23245 348/340 |
| 2009/0027542 | A1* | 1/2009 | Yamamoto ........... H04N 5/2254 348/340 |

* cited by examiner

*Primary Examiner* — Trang U Tran

(74) *Attorney, Agent, or Firm* — Ware, Fressola, Maguire & Barber LLP

(57) ABSTRACT

A multiple-lens camera has only one image sensor to capture a number of images at different viewing angles. Using a single image sensor, instead of a number of separate image sensors, to capture multiple images simultaneously, one can avoid the calibration process to calibrate the different image sensors to make sure that color balance and the gain are the same for all the image sensors used. The camera has a processor to receive from the image sensor electronic signals indicative of image data of the captured of images. The camera has a connector to transfer the processed image data to an external device or to an image display. The image display device is configured to display one of said plurality of images.

16 Claims, 2 Drawing Sheets

MULTI-LENS CAMERA WITH A SINGLE IMAGE SENSOR

CROSS-REFERENCE TO RELATED APPLICATION

This application is a continuation of and claims benefit to U.S. patent application Ser. No. 13/566,292, filed Aug. 3, 2012, and also claims benefit of provisional application Ser. No. 61/574,604, filed Aug. 5, 2011, whose contents are hereby incorporated by reference in their entirety.

FIELD OF THE INVENTION

The present invention relates generally to a multiple-lens camera and, more particularly, to a multiple-lens camera having only a single image sensor.

BACKGROUND OF THE INVENTION

In order to produce a 3D photograph, a camera must have two or more lenses to capture the images a scene at different angles. The captured images must be recorded on film or on an electronic medium.

SUMMARY OF THE INVENTION

The main aspect of the present invention is a camera having a plurality of imaging lenses arranged to form a plurality of images on an image plane and an image sensor disposed on the image plane to capture at least two of the images formed on the image plane. The number of imaging lenses can be N, which is a positive number greater than 1 and the image sensor is dimensioned to capture M images, where M is a positive integer smaller than or equal to N but greater than 1.

The camera has an adjustment mechanism for adjusting the distance between the image lenses, and a processor configured to receive from the image sensor electronic signals indicative of image data of said plurality of images.

The processor is configured to process the image data into processed image data, and the camera further comprises a connector for receiving electronic signals indicative of the processed image data and to transfer the electronic signals to an external device.

The camera also has an image display device configured to display one of said plurality of images.

DETAILED DESCRIPTION

Figure 1:
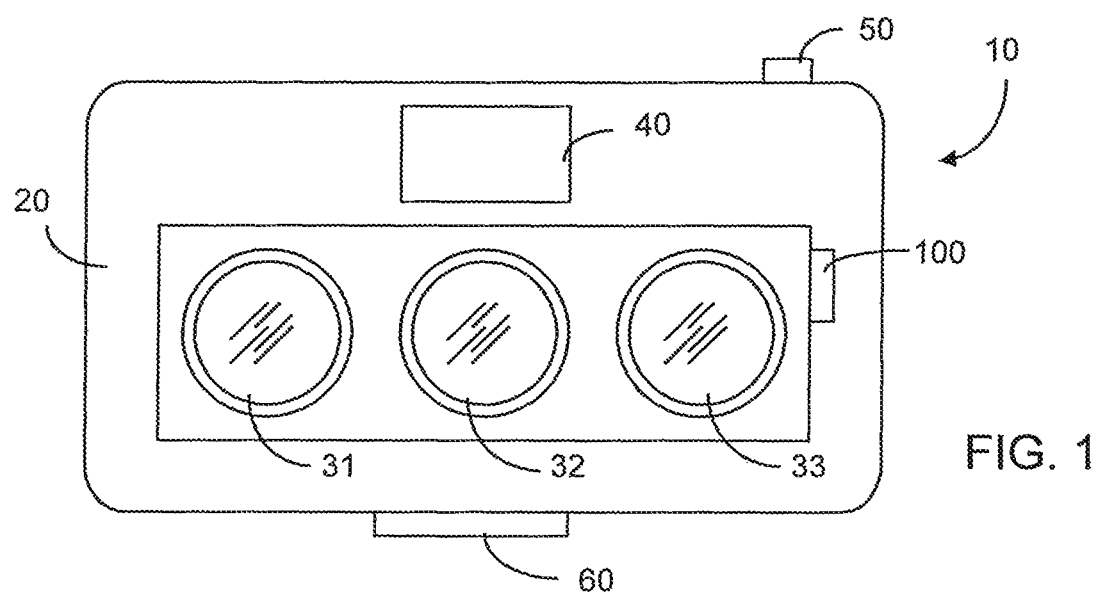
FIG. 1 is a front-view of the multiple-lens camera, according to the present invention.

The present invention is concerned with a camera having two or more imaging lenses capable of taking a plurality of images of the same scene at different viewing angles simultaneously. The multiple images can be used to compose a 3D picture, for example. The multiple-lens camera according to one embodiment of the present invention is shown in FIG. 1. As shown in FIG. 1, camera 10 comprises a housing 20 to accommodate two or more taking lenses or imaging lenses 31, 32 and 33 disposed adjacent to each other. All imaging lenses 31, 32 and 33 have the same focus length and they are arranged so that their image planes are substantially on the same plane. Camera 10 also has a shutter release button 50, and may have a flash unit 40 and a tripod mount 60.

Figure 2:
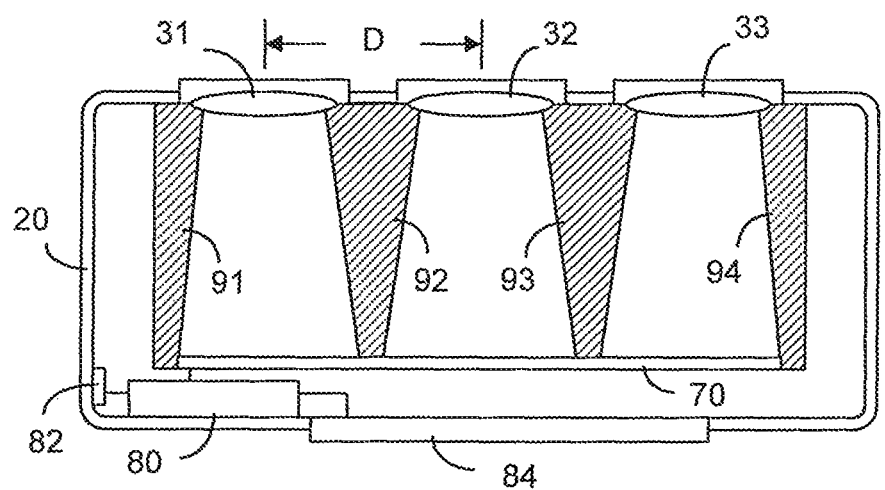
FIG. 2 is a schematic representation of the multi-lens camera.
Figure 3:
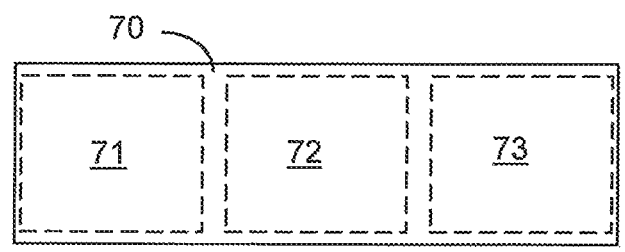
FIG. 3 shows a plurality of images formed on the single image sensor through different imaging lenses.

As shown in FIG. 2, camera 10 has only a single image sensor 70 located at the image plane of image lenses 31, 32 and 33. The image sensor 70 is dimensioned such that three images 71, 72 and 73 of the same scene but from different viewing angles can be formed simultaneously on the image sensor 70 as illustrated in FIG. 3. The image sensor 70 is an electronic device which is configured to convert the optical images formed on the sensor into electronic signals. Camera 10 also has an image storage/processor 80 electronically connected to the image sensor 70. The image storage/processor 80 is configured to receive the electronic signals indicative of image data from the image sensor 70. The image storage/processor 80 is also configured to process the image data into a form suitable for viewing and transferring, for example. Camera 10 has a connector 82 for transferring the processed image data to an exterior electronic device, such as a computer, a printer, a memory device or an image display unit (not shown). Camera 10 also has an electronic display 84, such as an LCD or light-emitting display unit, to show an image of the scene. In one embodiment of the present invention, camera 10 also has a plurality of light shields 91, 92, 93 and 94 to minimize the light entering one of the lenses from reaching outside the corresponding part of the image sensor 70.

The images 71, 72 and 73 can be used to compose a three-dimensional (3D) picture or to make a regular 2D picture. It is understood that the apertures of the multiple lenses 31, 32 and 32 can be made substantially the same size. As such, the exposure time and exposure value of each of the images 71, 72 and 73 is substantially the same as the exposure of the other images. Furthermore, the color balance of one image is practically identical to the color balance of the other.

Figure 4:
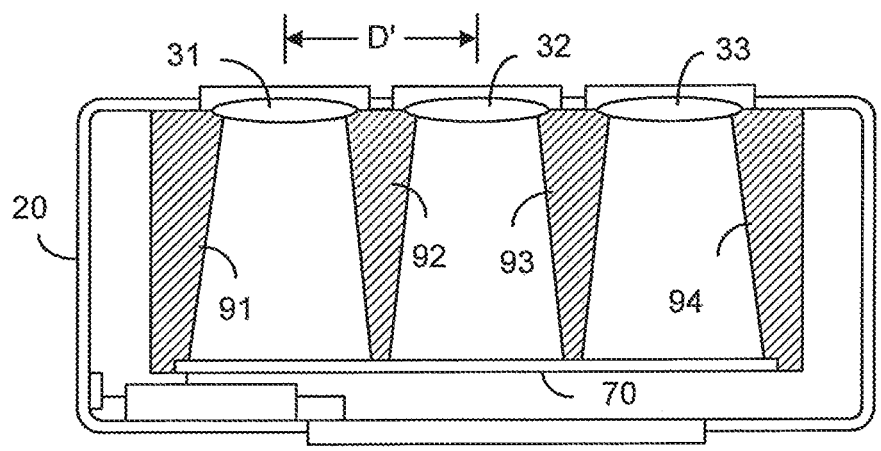
FIG. 4 shows that the distance between imaging lenses can be adjusted.
Figure 5:
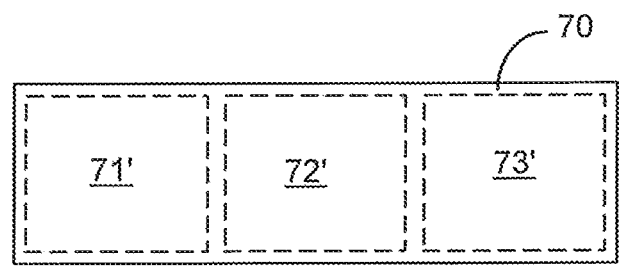
FIG. 5 shows the images formed on the single image sensor with the distance between imaging lenses adjusted.

In one embodiment of the present invention, the distance between adjacent lenses can be adjusted so as to control the amount of parallax between views. Thus, camera 10 may comprise an adjusting mechanism 100 to adjust the distance between lenses. For example, the distance between two adjacent lenses is D as shown in FIG. 2 and the images formed on the image sensor 70 are 71, 72 and 73 (FIG. 3). If the distance between adjacent lenses is reduced to D', as shown in FIG. 4, the images formed on the image sensor 70 are laterally shifted. The shifted images 71', 72' and 73' are shown in FIG. 5.

When a number of image sensors are used to capture a number of images, it is necessary to calibrate the different image sensors to make sure that color balance and the gain are the same for all the image sensors used. Using a single image sensor, instead of a number of separate image sensor, to capture multiple images simultaneously, one can avoid the above-mentioned calibration process.

It should be noted that FIGS. 1 to 5 are used for illustration purposes only. The number of imaging lenses can be two, three, . . . , ten or more. Nevertheless, the camera has only one imaging sensors to capture the images formed by all the imaging lenses.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A camera, comprising:
   a plurality of imaging lenses arranged to form a plurality of images on a same plane; and
   a single image sensor disposed on said same plane, the image sensor dimensioned to capture at least two of said plurality of images simultaneously formed on the image sensor, wherein each of said plurality of imaging lenses is entirely separated and spaced from an adjacent one of said plurality of imaging lenses, wherein all of said plurality of imaging lenses have substantially a same focal length; wherein each of said plurality of imaging lenses arranged to form one of said plurality of images in a corresponding area on the image sensor, said camera further comprising: a plurality of light shields configured to minimize light entering each of said plurality of images lenses from reaching outside the corresponding area on the image sensor; wherein each of said plurality of light shields comprises a first shield end a second shield end, and wherein the first shield end is located adjacent to at least one of said plurality of imaging lenses and the second shield end is located adjacent to the image sensor.

2. The camera according to claim 1, where the number of imaging lenses is N, a positive integer greater than 1, and the image sensor is dimensioned to capture N images.

3. The camera according to claim 1, further comprising:
   a processor configured to receive from the image sensor electronic signals indicative of image data of said plurality of images.

4. The camera according to claim 3, wherein the processor is further configured to process the image data into processed image data, said camera further comprising:
   a connector configured to receive further electronic signals indicative of the processed image data and to transfer the further electronic signals to an external device.

5. The camera according to claim 1, further comprising:
   an image display device configured to display one of said plurality of images.

6. The camera according to claim 1, wherein each of said plurality of imaging lenses is arranged to form a different one of said plurality of images at an image plane substantially located on said same plane.

7. The camera according to claim 1, wherein each of said plurality of imaging lenses arranged to form one of said plurality of images in a corresponding area on the image sensor, said camera further comprising:
   a plurality of light shields, each of said plurality of light shields comprising a first shield end and a second shield end, and wherein the first shield end is located adjacent to at least one of said plurality of imaging lenses and the second shield end is configured to define the corresponding area on the image sensor.

8. The camera according to claim 1, wherein said plurality of images are views of a same scene at different viewing angles, and wherein the imaging lenses are arranged so that all of said plurality of images are substantially identical except for an amount of parallax between the views.

9. A method for producing a plurality of images of a same scene at different viewing angles, comprising:
   arranging a plurality of imaging lenses to form said plurality of images on a same plane; and
   disposing a single image sensor on said same plane, the image sensor dimensioned to capture at least two of said plurality of images simultaneously formed on the image sensor, wherein each of said plurality of imaging lenses is entirely separated and spaced from an adjacent one of said plurality of imaging lenses, and wherein all of said plurality of imaging lenses have substantially a same focal length; wherein each of said plurality of imaging lenses arranged to form one of said plurality of images in a corresponding area on the image sensor, said method further comprising: providing a plurality of light shields configured to minimize light entering each of said plurality of images lenses from reaching outside the corresponding area on the image sensor; wherein each of said plurality of light shields comprises a first shield end a second shield end, and wherein the first shield end is located adjacent to at least one of said plurality of imaging lenses and the second shield end is located adjacent to the image sensor.

10. The method according to claim 9, where the number of imaging lenses is N, a positive integer greater than 1, and the image sensor is dimensioned to capture N images.

11. The method according to claim 9, further comprising:
    arranging a processor to receive from the image sensor electronic signals indicative of image data of said plurality of images, and
    configuring the processor to process the image data into processed image data.

12. The method according to claim 11, further comprising:
    providing a connector configured to receive further electronic signals indicative of the processed image data and to transfer the further electronic signals to an external device.

13. The method according to claim 9, further comprising:
    providing an image display device configured to display one of said plurality of images.

14. The method according to claim 9, wherein each of said plurality of imaging lenses is arranged to form a different one of said plurality of images at an image plane substantially located on said same plane.

15. The method according to claim 9, wherein each of said plurality of imaging lenses arranged to form one of said plurality of images in a corresponding area on the image sensor, said method further comprising:
    providing a plurality of light shields, each of said plurality of light shields comprises a first shield end a second shield end, and wherein the first shield end is located adjacent to at least one of said plurality of imaging lenses and the second shield end is configured to define the corresponding area on the image sensor.

16. The method according to claim 9, wherein said plurality of images are views of a same scene at different viewing angles, and wherein the imaging lenses are arranged so that all of said plurality of images are substantially identical except for an amount of parallax between the views.

* * * * *